US012591696B1

(12) United States Patent
Nagarajan et al.

(10) Patent No.: US 12,591,696 B1
(45) Date of Patent: Mar. 31, 2026

(54) ENFORCING ACCESS RESTRICTIONS FOR FINE-TUNING MACHINE LEARNING MODELS

(71) Applicant: Amazon Technologies, Inc., Seattle, WA (US)

(72) Inventors: Arun Babu Nagarajan, Redmond, WA (US); Paras Mehra, Oakland, CA (US); Wei You, Kirkland, WA (US); Aditya Bindal, Burlingame, CA (US); Sifei Li, Bothell, WA (US); Xichao Wang, Redmond, CA (US); Yingqi Wang, Kenmore, WA (US); Tritin Truong, Vancouver (CA); Zhihan Li, Seattle, WA (US); Qiushi Wuye, Seattle, WA (US); Rajendra Kumar Vippagunta, Issaquah, WA (US); Harish Panwar, Redmond, WA (US); Tejaswi Manjunath, Bothell, WA (US); Rakesh Ramakrishnan, Issaquah, WA (US); Gal Oshri, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 206 days.

(21) Appl. No.: 18/478,052

(22) Filed: Sep. 29, 2023

(51) Int. Cl.
*G06F 21/62* (2013.01)
(52) U.S. Cl.
CPC .................................... *G06F 21/62* (2013.01)

(58) Field of Classification Search
CPC .............................................. G06F 21/62–629
See application file for complete search history.

(56) References Cited

U.S. PATENT DOCUMENTS

| | | | | |
|---|---|---|---|---|
| 10,956,584 | B1 * | 3/2021 | Heaton | ................. G06F 9/3802 |
| 2018/0351816 | A1 * | 12/2018 | Li | ...................... G06F 11/3452 |
| 2021/0397793 | A1 | 12/2021 | Li et al. | |
| 2022/0050918 | A1 * | 2/2022 | Macedo | ............. G06F 18/2148 |
| 2022/0067181 | A1 * | 3/2022 | Carley | .................. H04L 9/0618 |
| 2023/0060252 | A1 | 3/2023 | Bly et al. | |
| 2024/0362487 | A1 * | 10/2024 | ElKordy | ............... G06N 20/00 |

FOREIGN PATENT DOCUMENTS

| | | | | |
|---|---|---|---|---|
| WO | 2023132834 | | 7/2023 | |
| WO | WO-2023123155 | A1 * | 7/2023 | ............. G06N 20/00 |
| WO | WO-2023198768 | A1 * | 10/2023 | ............. G06N 20/00 |

* cited by examiner

*Primary Examiner* — Madhuri R Herzog
(74) *Attorney, Agent, or Firm* — S. Scott Foster; Kowert, Hood, Munyon, Rankin & Goetzel, P.C.

(57) ABSTRACT

Access restrictions are enforced for fine-tuning a machine learning model. A request to fine tune a machine learning model is received. The machine learning model may be subject to provider access restrictions. Tuning data for fine-tuning the machine learning model may be subject to consumer access restrictions. Fine-tuning may be performed that enforces both the provider access restrictions and consumer access restrictions to generate a tuned set of weights that are combinable with weights of the trained machine learning model to perform inferences as a fine-tuned machine learning model.

20 Claims, 9 Drawing Sheets

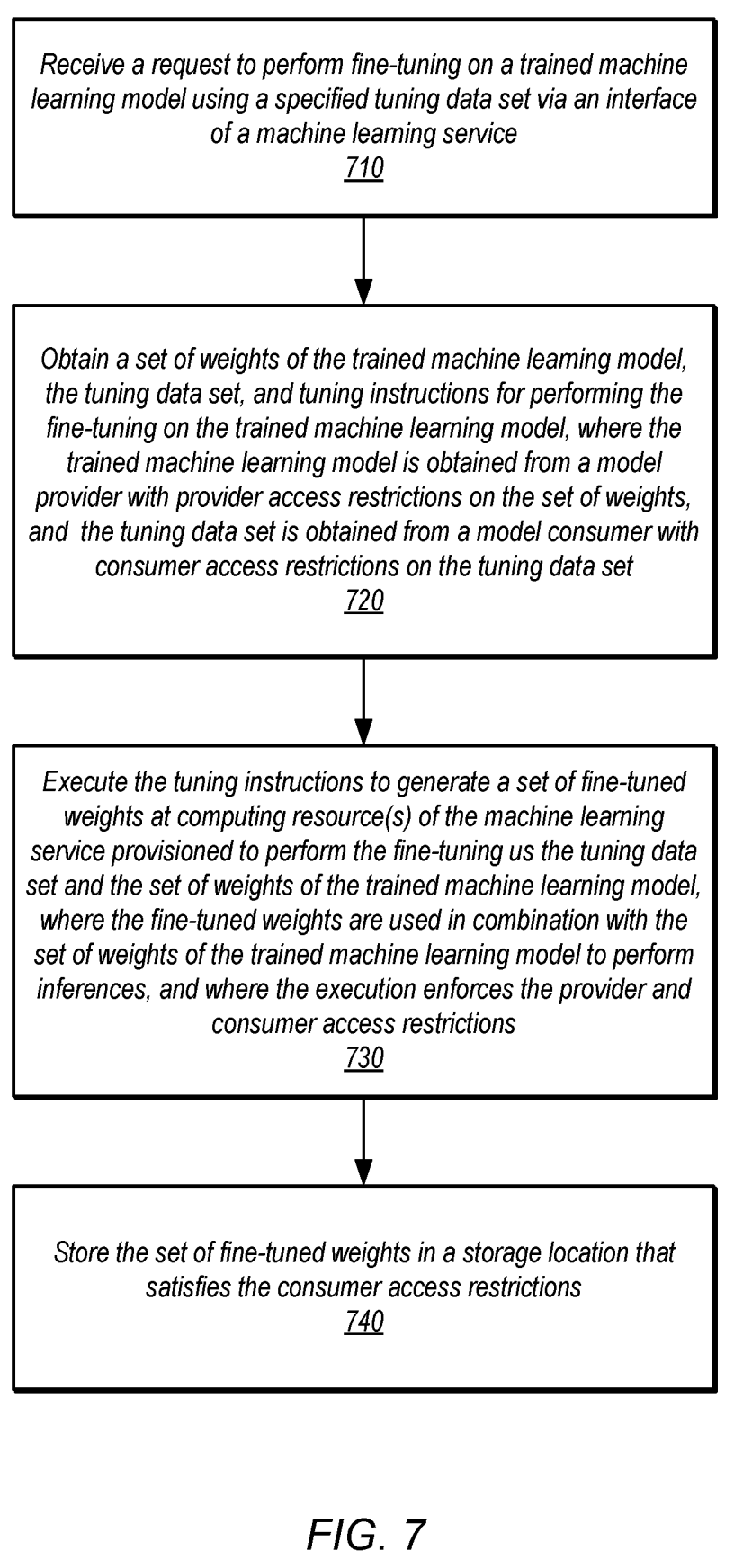

*Receive a request to perform fine-tuning on a trained machine learning model using a specified tuning data set via an interface of a machine learning service*
*710*

*Obtain a set of weights of the trained machine learning model, the tuning data set, and tuning instructions for performing the fine-tuning on the trained machine learning model, where the trained machine learning model is obtained from a model provider with provider access restrictions on the set of weights, and the tuning data set is obtained from a model consumer with consumer access restrictions on the tuning data set*
*720*

*Execute the tuning instructions to generate a set of fine-tuned weights at computing resource(s) of the machine learning service provisioned to perform the fine-tuning us the tuning data set and the set of weights of the trained machine learning model, where the fine-tuned weights are used in combination with the set of weights of the trained machine learning model to perform inferences, and where the execution enforces the provider and consumer access restrictions*
*730*

*Store the set of fine-tuned weights in a storage location that satisfies the consumer access restrictions*
*740*

*FIG. 7*

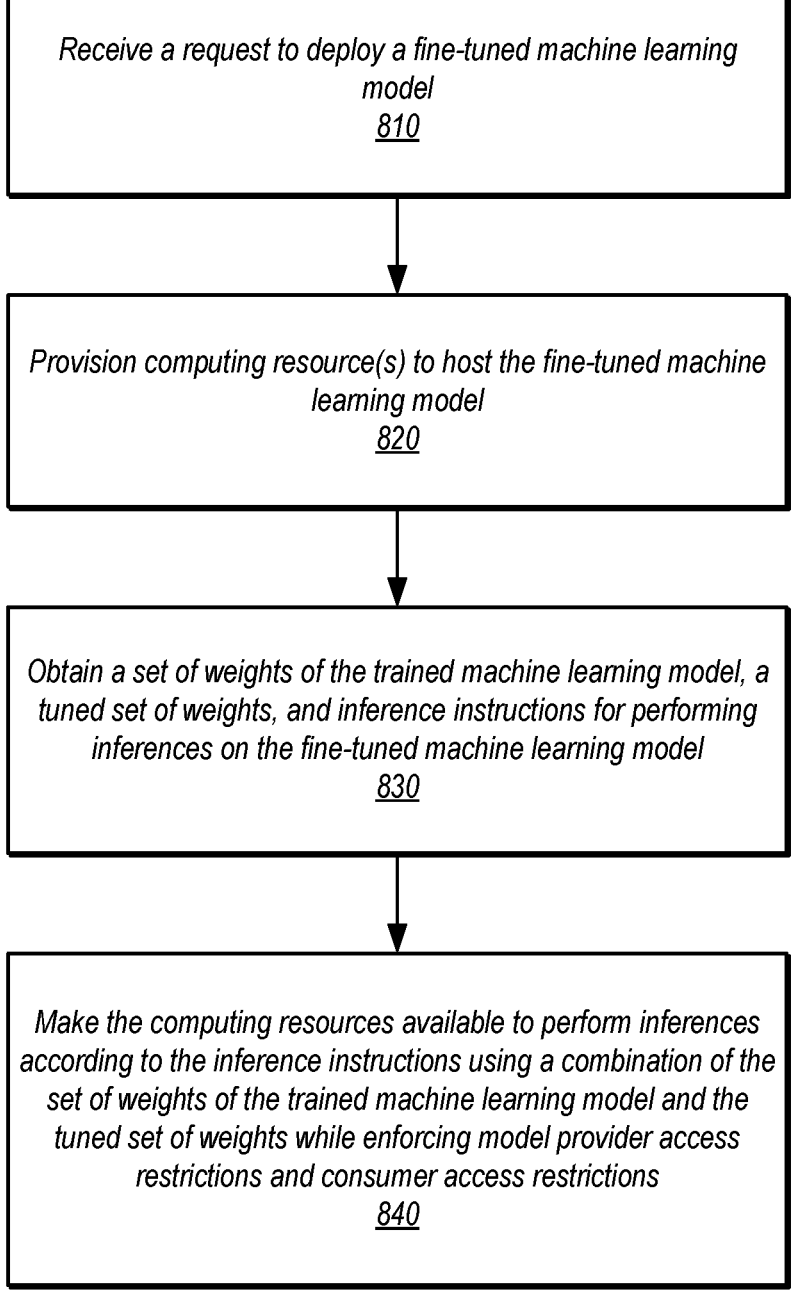

*Receive a request to deploy a fine-tuned machine learning model*
*810*

*Provision computing resource(s) to host the fine-tuned machine learning model*
*820*

*Obtain a set of weights of the trained machine learning model, a tuned set of weights, and inference instructions for performing inferences on the fine-tuned machine learning model*
*830*

*Make the computing resources available to perform inferences according to the inference instructions using a combination of the set of weights of the trained machine learning model and the tuned set of weights while enforcing model provider access restrictions and consumer access restrictions*
*840*

*FIG. 8*

ENFORCING ACCESS RESTRICTIONS FOR FINE-TUNING MACHINE LEARNING MODELS

BACKGROUND

Machine-learned models and data-driven systems have been increasingly used to help make decisions in various application domains. These applications have provided benefits such as improved accuracy, increased productivity, and cost savings. This trend is the result of a confluence of factors, such as ubiquitous connectivity, the ability to collect, aggregate, and process large amounts of fine-grained data using cloud computing, and improved access to increasingly sophisticated machine learning models that can analyze this data.

BRIEF DESCRIPTION OF THE DRAWINGS

FIG. 7 is a high-level flowchart illustrating various methods and techniques for enforcing access restrictions for fine-tuning machine learning models, according to some embodiments.

FIG. 8 is a high-level flowchart illustrating various methods and techniques for deploying a fine-tuned machine learning model and enforcing access restrictions, according to some embodiments.

Figure 1:
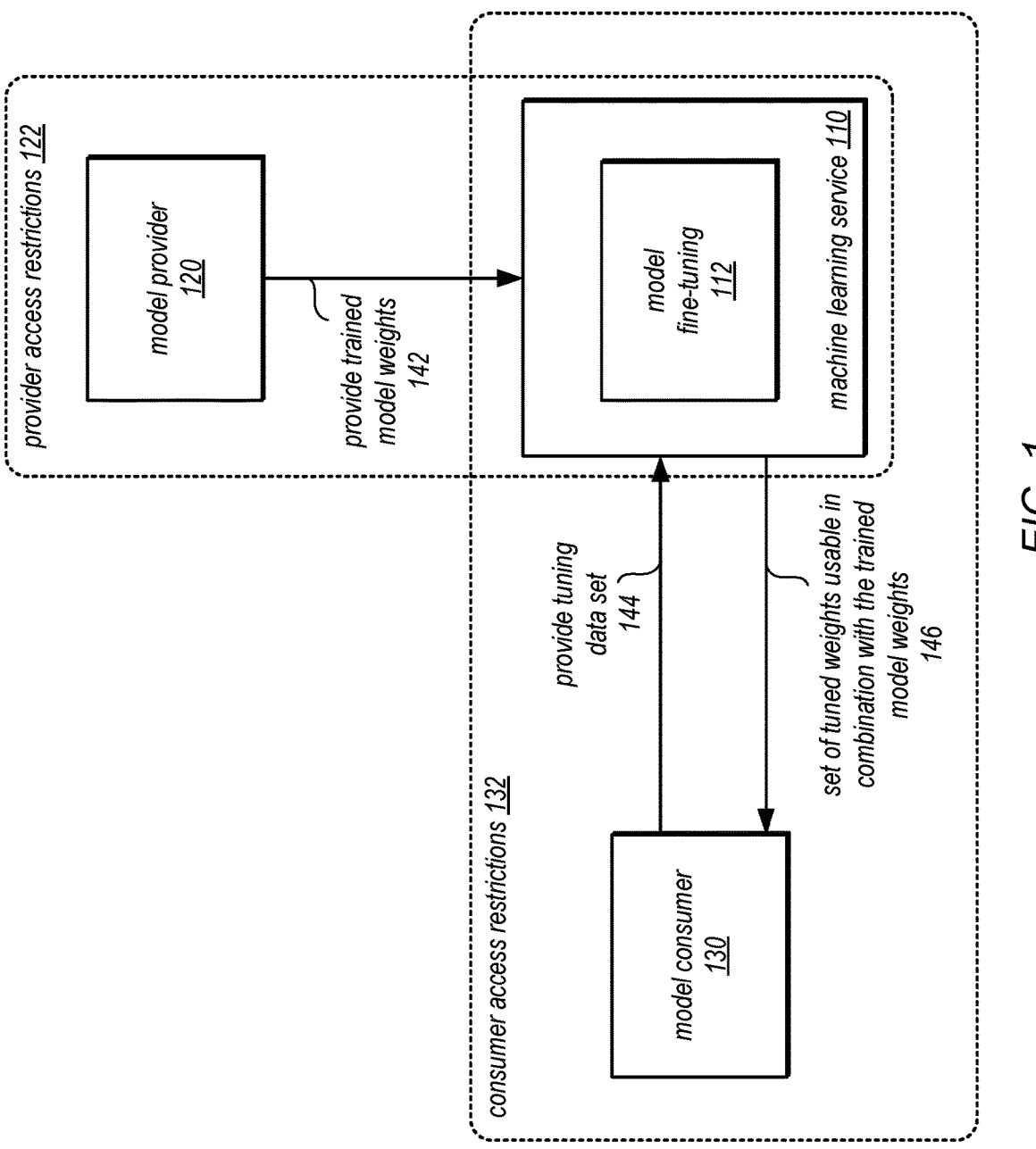
FIG. 1 illustrates a logical block diagram of enforcing access restrictions for fine-tuning machine learning models, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of enforcing access restrictions for fine-tuning machine learning models are described herein. Machine learning refers to a discipline by which computer systems can be trained to recognize patterns through repeated exposure to training data. In unsupervised learning, a self-organizing algorithm learns previously unknown patterns in a data set without any provided labels. In supervised learning, this training data includes an input that is labeled (either automatically, or by a human annotator) with a "ground truth" of the output that corresponds to the input. A portion of the training data set is typically held out of the training process for purposes of evaluating/validating performance of the trained model. The use of a trained model in production is often referred to as "inference," or a "prediction" during which the model receives new data that was not in its training data set and provides an output based on its learned parameters.

Fine-tuning may refer to techniques to adapt the features of a previously trained machine learning model (e.g., the weights) according to additional training data that may "tune" or otherwise adapt the trained machine learning model's performance to specific uses or scenarios included in the additional training data. For example, a computer vision model that performs object classification generally may be tuned to recognize a particular category of objects, such as traffic signs, in image data. However, there may be scenarios where fine-tuning of a trained machine learning model is desirable, but modification of the trained machine learning model itself is not supported or allowed due to access restrictions.

For example, some machine learning models are developed as the result of significant technological effort and resource costs. Appropriate data sets may have to be curated and the architecture of the machine learning model designed to provide a high-performing machine learning model. Some of these machine learning models can be extremely large using, for instance, billions of parameters, allowing the model to be adaptable to a wide category of use cases and tasks, such as text and image generation and summarization. These machine learning models, which are sometimes referred to as "foundation models", may perform well without any adaptation. However, in many scenarios, better performance can be achieved if the models are fine-tuned to specific uses cases. Given the technological efforts and resource costs expended to develop and train these machine learning models, model providers may impose access restrictions on the content of the models (e.g., the weights of model parameters), as it would otherwise have to surrender proprietary model information if the content of the models were to be accessible. Accordingly, techniques for fine-tuning machine learning models that preserve the access restrictions of model providers may be highly desirable.

Consumers of these machine learning models may not be without their own data privacy concerns. Training data used to fine-tune machine learning models may be subject to regulatory, proprietary, sensitive, or other access restrictions that would prohibit or make it undesirable to grant access to the training data, especially to model providers which could make use of the training data to enhance the performance of the machine learning model more generally. Accordingly, techniques for fine-tuning machine learning models that preserve the access restrictions of model consumers may also be highly desirable.

In order to satisfy the access restrictions of both model providers and model consumers, a machine learning service can support fine-tuning techniques that make the restricted data opaque to entities without access (e.g., a model provider cannot access model consumer tuning data and the resulting fine-tuned model, and a model consumer cannot access the trained machine learning model directly). By implementing these fine-tuning techniques, the performance advantages offered by some machine learning models, such as foundation models, can be made available and adaptable to specific use cases through fine-tuning techniques, improving the performance of systems, services, or applications that utilize fine-tuned machine learning models without violating the access restrictions of both model providers and model consumers.

FIG. 1 illustrates a logical block diagram of enforcing access restrictions for fine-tuning machine learning models, according to some embodiments. Model provider 120 may develop and train a machine learning model that may be made available to various model consumers, such as model consumer 130. Machine learning service 110, which may be a machine learning service of a services provider (e.g., a cloud computing services provider) similar to that of machine learning service 210 discussed in detail below with regard to FIGS. 2-6, or implemented differently (e.g., as a standalone service), may support enforcing access restrictions for the trained machine learning model offered by model provider 120. Provider access restrictions 122 may limit access to the trained machine learning model, such as by prohibiting access to model consumers, like model consumer 130.

Model consumer 130 may have identified the trained machine learning model for incorporation into a system, service, or application. In order to adapt performance of the trained machine learning model to a desired use case, model consumer 130 may initiate model fine-tuning 112 at machine learning service 110. As part of fine-tuning, model consumer 130 may provide a tuning data set, as indicated at 144. The tuning data set may be subject to consumer access restrictions 132, which may, for example, limit access to the tuning data set, as well as any resulting tuned weights, such as by prohibiting access to model provider 120. In some embodiments, access restrictions may be described as preventing exfiltration of protected data to a different entity (e.g., a model provider cannot access model consumer tuning data and the resulting fine-tuned model weights, and a model consumer cannot access the weights of a trained machine learning model directly).

Model fine-tuning 112 may perform various fine-tuning techniques that do not violate the consumer access restrictions 132 and provider access restrictions 122, such as the various fine-tuning techniques discussed below with regard to FIG. 5, that generate additional tuned sets of weights (different from the trained model weights provided at 142). Once generated, the set of tuned weights may be provided to model consumer 130 for various uses, including deployment as discussed in detail below with regard to FIGS. 6 and 8. As indicated at 146, the set of tuned weights may not be useable without the trained model weights. Instead, the set of tuned weights may be used in combination with the trained model weights to implement the fine-tuned version of the machine learning model. For example, both the tuned weights and the trained model weights may be used when generating an inference using the fine-tuned model.

Please note that the previous description is a logical illustration of a machine learning service and thus is not to be construed as limiting as to other embodiments of a machine learning service.

This specification continues with a general description of a provider network that implements multiple different services, including a machine learning service, which may implement enforcing access restrictions for fine-tuning machine learning models, according to some embodiments. Then various examples of, including different components/ modules, or arrangements of components/module that may implement enforcing access restrictions for fine-tuning machine learning models are discussed. A number of different methods and techniques to implement enforcing access restrictions for fine-tuning machine learning models are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
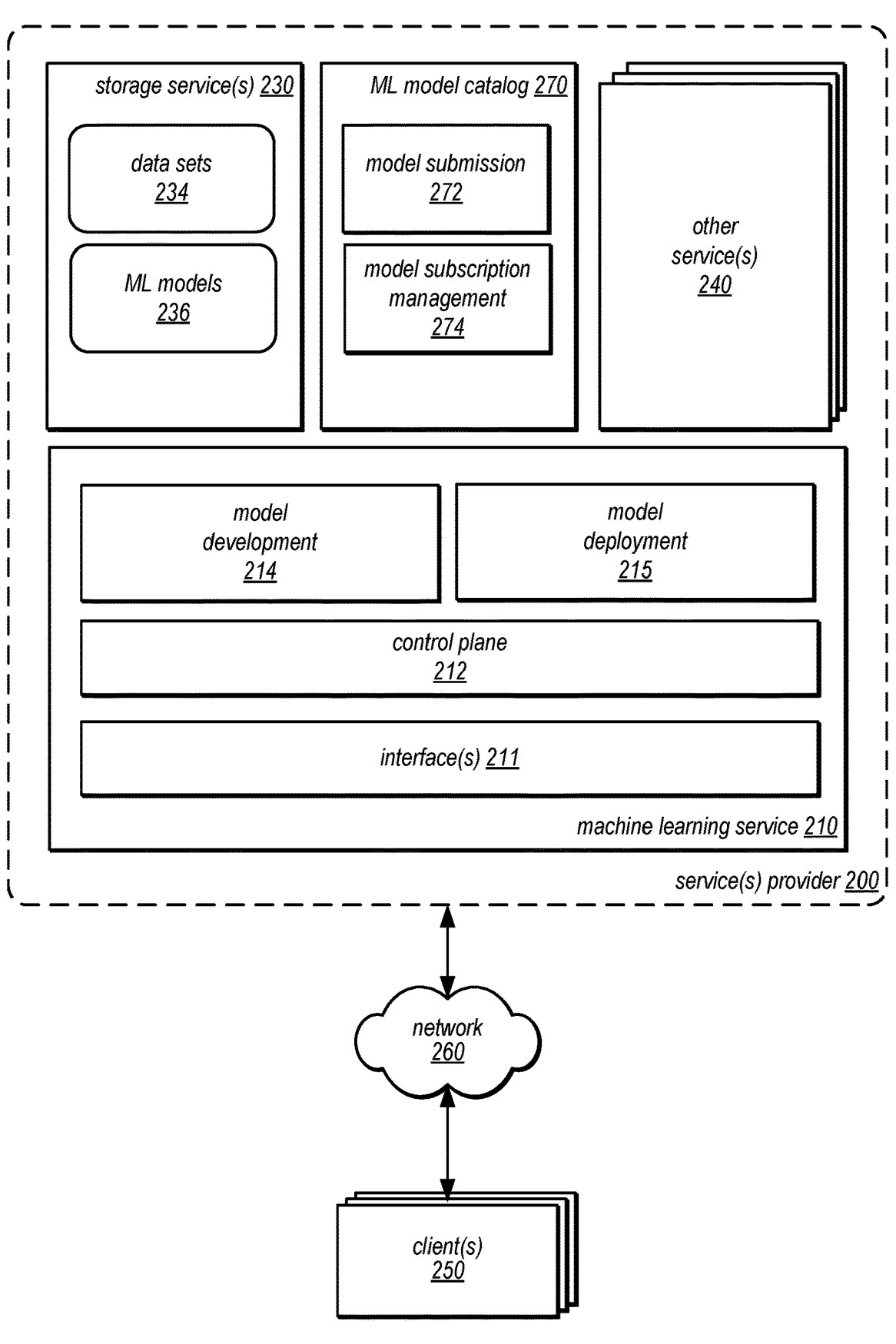
FIG. 2 illustrates an example provider network that may implement a machine learning service that implements enforcing access restrictions for fine-tuning machine learning models, according to some embodiments.

FIG. 2 illustrates an example provider network that may implement a machine learning service that implements enforcing access restrictions for fine-tuning machine learning models, according to some embodiments. Service(s) provider 200 may be a private or closed system or may be set up by an entity such as a company or a public sector organization to provide one or more services (such as various types of cloud-based storage) accessible via the Internet and/or other networks to clients 250, in one embodiment. Service(s) provider 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services offered by the service(s) provider 200, in one embodiment. In some embodiments, service(s) provider 200 may implement various computing resources or services, such as machine learning service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below, in one embodiment. In various embodiments, the functionality of a given system or service component (e.g., a component of machine learning service 210 may be implemented by a particular node or may be distributed across several nodes. In some embodiments, a given node may implement the functionality of more than one service system component (e.g., more than one data store component).

Machine learning service 210 may implement interface 211 to allow clients (e.g., client(s) 250 or clients implemented internally within service(s) provider 200, such as a client application hosted on another provider network service like an event driven code execution service or virtual compute service) to compress, train, and deploy machine learning models (e.g., neural networks), or various other machine learning model development, deployment, or analysis features. For example, machine learning service 210 may implement interface 211 (e.g., a graphical user interface, programmatic interface that implements Application Program Interfaces (APIs) and/or a command line interface) may be implemented so that a client can submit, edit, or otherwise implement various different model development, deployment, labeling or other management requests. For example, interface 211 may include development and deployment environment, which may provide a training script or other code editor with various development tools to create, submit, and/or monitor machine learning pipeline with a tuning job and/or create a model package, as discussed below.

Machine learning service 210 may implement a control plane 212 to perform various control operations to implement the features of machine learning service 210. For example, control plane may monitor the health and performance of requests at different components, such as training as part of model development, execution of machine learning models as part of model deployment 215 or development and training of machine learning models as part of model development 214. For example, if a node or other component fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s), in various embodiments. For example, control plane 212 may receive requests interface 211 which may be a programmatic interface, and identify an available node to begin work on the request.

Machine learning service 210 may implement model development 214 to develop, configure, program, define, and/or otherwise execute training jobs on various machine learning models using data sets, such as data sets 234 in storage services 230 across one or more training nodes (which may include one or more respective processing devices for training, such as GPUs). In some embodiments machine learning service 210 may offer various virtual machines, instances, containers, images, or other applications on these training nodes that may implement various machine learning training frameworks (e.g., TensorFlow, PyTorch, MXNet, and XGBoost, among others) upon which machine learning models may be specified or otherwise described using, for instance, a development environment, and executed. Various tests or other development operations for machine learning models may also be performed. In some embodiments, the various files, configuration information, and other data for machine learning model development may be organized as a project (or other collection) and stored, versioned, or otherwise managed by model development 214 (e.g., as a collection of one or more files or data objects in storage services 230, including data sets 234 and ML models 236). Training jobs may be submitted to training nodes (e.g., via development environment or other interfaces) to train machine learning models on identified data set(s). As discussed in detail below with regard to FIGS. 4 and 5, opaque fine-tuning requests may be submitted as well.

In various embodiments, machine learning service 210 may implement model deployment 215, which may deploy a trained machine learning model on resources (e.g., virtual compute instances or containers) to receive and return inferences or other results according to requests or other inputs to the deployed model. For example, different types or configurations of resources (e.g., virtual compute instances with various hardware capabilities, including different amounts of processing capacity, memory, storage, and/or specialized hardware, such as GPUs and tensor processor units (TPUs)) may be provisioned or otherwise obtained from other services of service(s) provider 200 (e.g., a virtual compute service) and then the machine learning model deployed to that provisioned resource along with various software or other applications to support the receipt of requests for inferences and return inferences. As discussed in detail below with regard to FIG. 6, opaque fine-tuned machine learning models may be deployed, in some embodiments.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments, data storage service(s) 230 may include object or file data stores for putting, updating, and getting data objects or files, in some embodiments. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as image data files (e.g., digital photos or video files) audio files and web site log files. Data storage service(s) 230 may be accessed via programmatic interfaces (e.g., APIs) or graphical user interfaces.

Generally speaking, clients 250 may encompass any type of client that can submit network-based requests to service (s) provider 200 via network 260, including requests for machine learning service 210 (e.g., a request to create or perform an explanation job, interact with development and management environment 213, etc.). For example, a given client 250 may include a suitable version of a web browser, or may include a plug-in module or other type of code module that can execute as an extension to or within an execution environment provided by a web browser. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with service(s) provider 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to service(s) provider 200 to other applications in a manner that is transparent to those applications. Clients 250 may convey network-based services requests (e.g., access requests to configure or perform explanation jobs) via network 260, in one embodiment. In various embodiments, network 260 may encompass any suitable combination of networking hardware and protocols necessary to establish network-based-based communications between clients 250 and service(s) provider 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and service(s) provider 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and service(s) provider 200. It is noted that in some embodiments, clients 250 may communicate with service(s) provider 200 using a private network rather than the public Internet.

Figure 3:
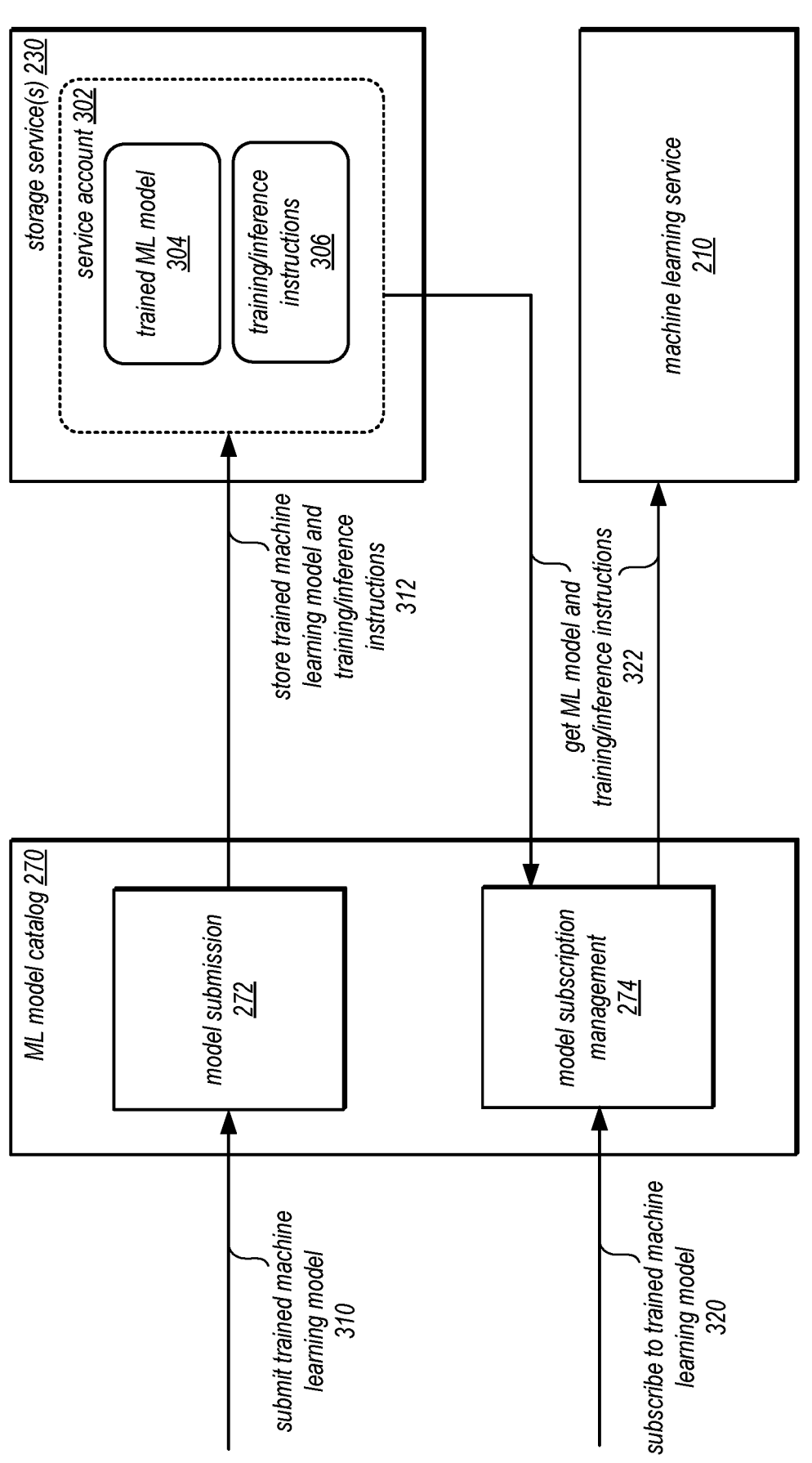
FIG. 3 is a logical block diagram illustrating interactions with a machine learning model catalog, according to some embodiments.

As discussed above with regard to FIG. 1, model providers may provide trained machine learning models for model consumers to use as part of an application. In at least some embodiments, machine learning model catalog 270 may be implemented as part of service(s) provider 200 to provide for the submission of new trained machine learning models 272 as well as allowing for models to be used through model subscription management 274. FIG. 3 is a logical block diagram illustrating interactions with a machine learning model catalog, according to some embodiments. As indicated at 310, a request to submit a trained machine learning model may be made to model submission 272.

Model submission 272 may apply various validation, formatting, encryption, or other access management techniques and store the trained machine learning model in a service account 302 in storage services 230, as indicated at 312. Service account 302 may act as an escrow account on behalf of a model provider, storing trained ML model 304 and training/inference instructions 306, such that access is restricted unless granted by the model provider (e.g., for use as opaque fine-tuning as discussed in detail below). In some embodiments, as part of model submission 310, both the trained ML model 304 (e.g., the architecture and parameter weights for a neural network) and the training/inference instructions 306 may be provided (e.g., as scripts, executables, images, etc.). As part of submission request 310, various access restrictions may be specified in including whether (if any) opaque fine-tuning and/or non-opaque fine-tuning may be performed on the trained machine learning model. For example, some submitted trained machine learning models may be used (e.g., invoked to perform inference requests) without allowing for any fine-tuning in accordance with the submission request 310.

As indicated at 320, a request to subscribe to a trained machine learning model may be received at model subscription management 274. For instance, various indexes or other data structures may be made searchable via an interface of ML model catalog 270. In some embodiments, the search request may include features to filter by supported fine-tuning type (e.g., opaque fine-tuning, non-opaque fine-tuning). Various descriptive information of many different machine learning models submitted and offered through ML model catalog 270 may be provided, including whether opaque fine-tuning is supported (or non-opaque fine-tuning is supported) for a machine learning model. For subscription requests, a registry or other subscriber index may be updated to include a model consumer (e.g., an account) for a requested machine learning model. When it is time to train or deploy the machine learning model, model subscription management 274 may verify a subscription and provide access credentials to obtain the ML model and training/inference instructions, as indicated at 322.

Figure 4:
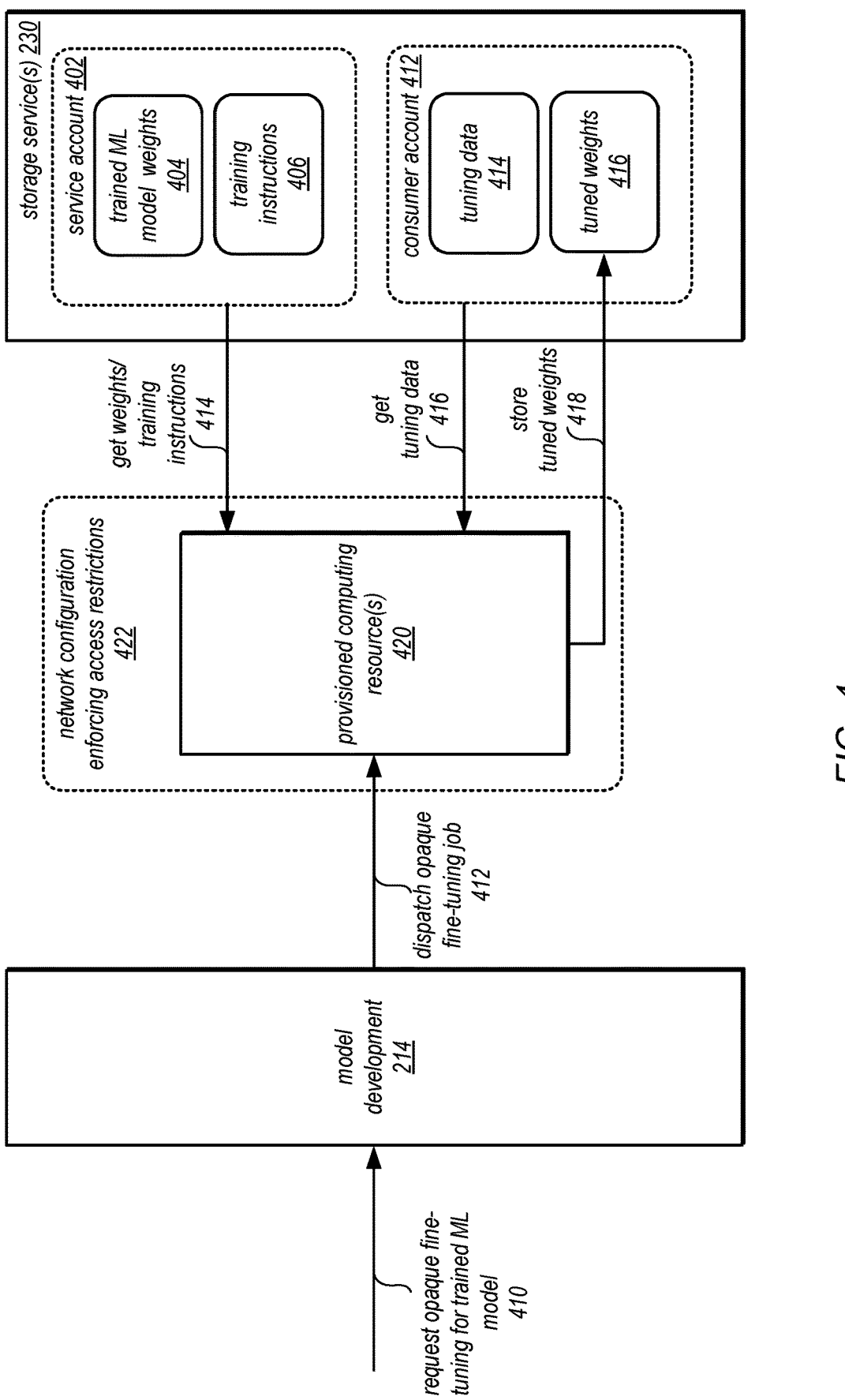
FIG. 4 is as logical block diagram illustrating interactions to request opaque fine-tuning, according to some embodiments.

FIG. 4 is as logical block diagram illustrating interactions to request opaque fine-tuning, according to some embodiments. As indicated at 410, a request for opaque fine-tuning for trained ML model may be received at model development 214. In some embodiments, other terminology such as privacy-preserving, restricted fine-tuning, or proprietary fine-tuning, among other terms which may invoke fine-tuning techniques that enforce both model provider and model consumer access restrictions on their respective data. The request 410 may include specified hyperparameters or other configuration to apply to the training instructions (e.g., including overriding some default hyperparameters). Request 410 may specify one of many different supported fine-tuning techniques (as discussed below with regard to FIG. 5). Model development 214 may dispatch the opaque fine-tuning job 412 to provisioned computing resources 420. A network configuration that enforces access restrictions 422 may be implemented (e.g., using virtual private network techniques to prevent exfiltration). For example, specialized network endpoints that impose firewalls other network traffic management techniques can be implemented that prevent outbound data from provisioned computing resources 420, allowing a tuning process to get weights/training instructions 414 to perform without sending data to external destinations outside of 422 (e.g., without allowing tuning data 416 to be sent to other destinations by provisioned computing resources and trained ML model weights 404/training instructions 406 to be sent to other destinations).

Provisioned computing resources may get 414 the weights and training instructions from service account 402, storing trained ML model weights 404 and training instructions 406. Provisioned computing resources 420 may also get 416 tuning data from consumer account 412 storing tuning data 414. Provisioned computing resources 420 may then perform opaque fine-tuning techniques, as discussed in detail below with regard to FIG. 5, and store the tuned weights 418, as tuned weights 416 in consumer account 412.

Figure 5:
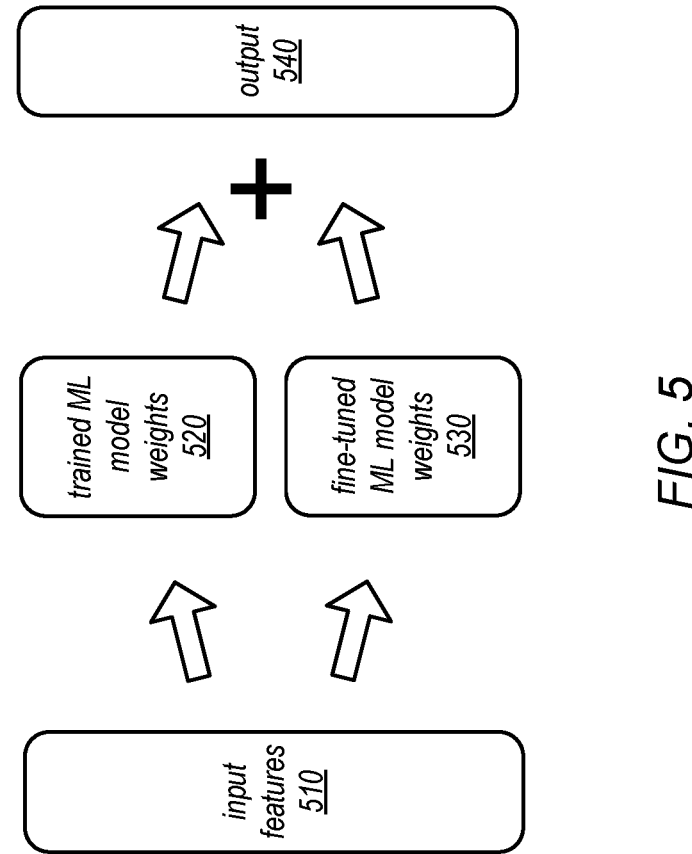
FIG. 5 is a logical block diagram illustrating techniques for opaquely fine-tuning a machine learning model, according to some embodiments.

FIG. 5 is a logical block diagram illustrating techniques for opaquely fine-tuning a machine learning model, according to some embodiments. Opaque fine-tuning techniques may be performed such that the underlying weights of the trained machine learning model do not have to be modified in order to modify performance of the model overall, allowing for fine-tuning without direct model modification. Instead, as depicted in FIG. 5, given some input features 510 that are provided to both trained ML model weights 520 and fine-tuned ML model weights 530, the resulting output can be combined (e.g., concatenated) and output 540 (e.g., as an embedding which can be decoded to provide an inference).

Various different types of opaque fine-tuning techniques may include Parameter Efficient Fine-Tuning (PEFT) techniques, in some embodiments. Parameter efficient fine-tuning refers to a set of fine-tuning techniques that do not require updating all the model weights. Instead, just a subset of the weights are updated. A notable component of PEFT methods only fine-tune a small number of (extra) model parameters. The following are some examples of PEFT techniques.

LoRA: Low Rank Adaptation is a technique where the pre-trained weights from the provided machine learning model are frozen and a smaller set of incremental weights are trained using the tuning data set. During inference, the results of the incremental weights are added to the frozen ones. LoRA can yield better results than incremental fine-tuning and be faster to fine-tune.

AdaLoRA: LoRA but with an adaptive learning rate that adjusts based on the curvature information of the loss landscape.

Prefix Tuning: The idea behind prefix-tuning is to optimize a continuous vector that is prepended to the input of a language model. This vector, also known as a "prefix", is used to guide the model's generation process. Prefix-tuning only adjusts the prefix, leaving the rest of the model parameters fixed.

P-Tuning: A set of trainable parameters (P) as additional tokens are introduced at the beginning of the input sequence. These parameters are learned during the fine-tuning process and are task-specific.

Prompt Tuning: A mechanism for learning "soft prompts" to condition frozen language models to perform specific downstream tasks from labeled examples.

RLHF: Leveraging reinforcement learning to "teach" a model with a reward model tuned on human feedback data.

Figure 6:
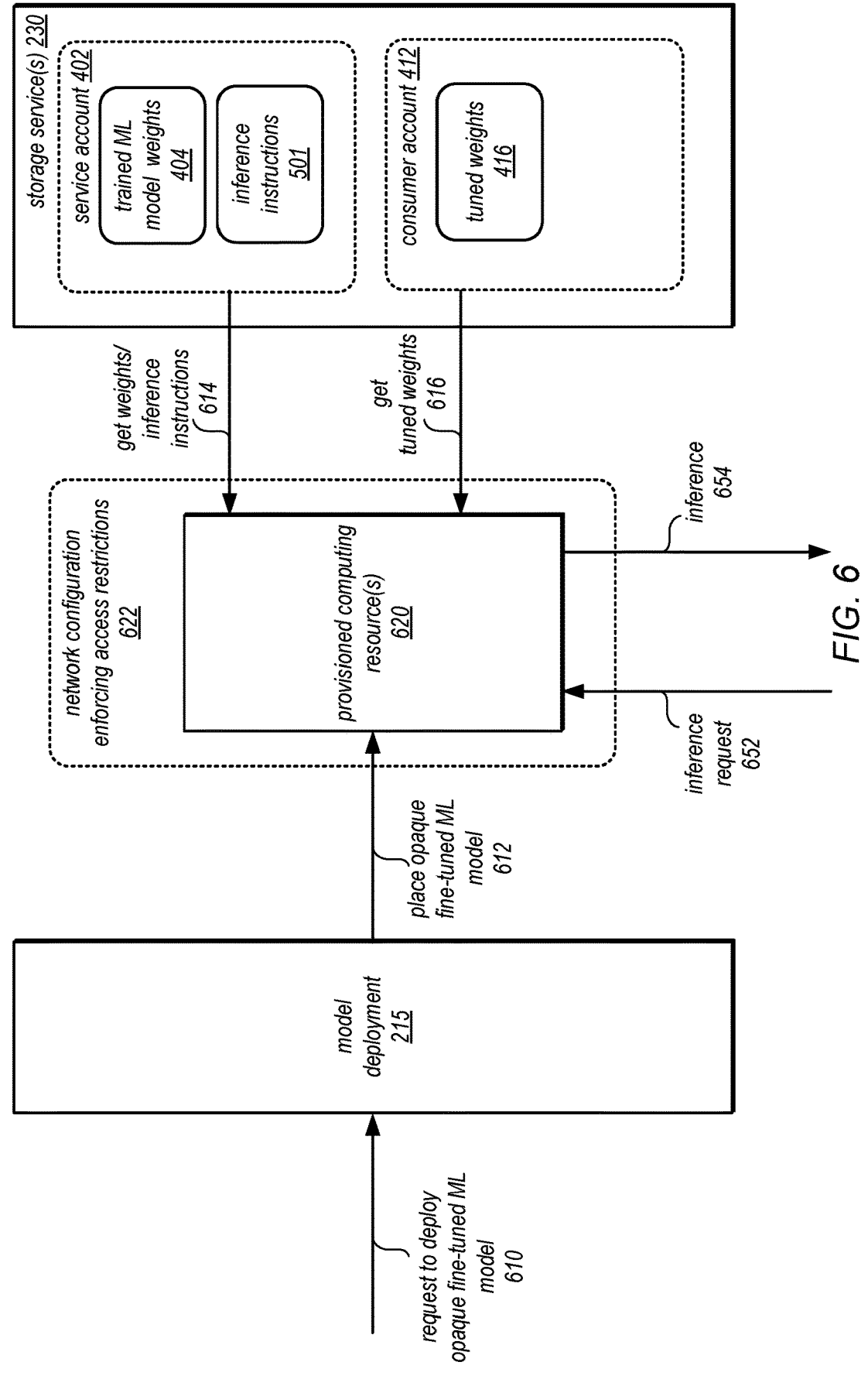
FIG. 6 is a logical block diagram illustrating interactions to deploy an opaquely fine-tuned machine learning model, according to some embodiments.

FIG. 6 is a logical block diagram illustrating interactions to deploy an opaquely fine-tuned machine learning model, according to some embodiments. As indicated at 610, a request to deploy an opaque fine-tuned ML model may be received. The request may include various information to configure deployment including a location (e.g., provider network region) and host system configuration (e.g., computing resource type, such as an instance type). In some embodiments, a model package (e.g., a configuration file or other description of the originally trained and tuned model weights along with the training and inference instructions may be first created (e.g., by model deployment 215 in response to a request), which may then be referenced in request 610 (e.g., causing model deployment 215 to obtain the model deployment package from consumer account 412 (not illustrated) to provide to provisioned computing resources 620). Model deployment 612 may place the opaque fine-tuned ML model on provisioned computing resources 620. A network configuration that enforces access restrictions 622 may be implemented (e.g., using virtual private network techniques to prevent exfiltration). For instance, although provisioned computing resource(s) 620 may be requested and charged/billed to a user account that submitted deployment request 610, network configuration 622 may prevent any outbound data that includes the trained ML model weights 404 and inference instructions 501.

Provisioned computing resources may get 614 weights and inference instructions from service account 402, storing trained ML model weights 404 and inference instructions 501. Provisioned computing resources 620 may get 616 tuned weights 416 from consumer account 412. Using the combination of tuned weights 416 and trained ML model weights 404, inferences may be performed when request, as indicated at 652 and returned, as indicated at 654. For example, a client application, hosted in other services of service(s) provider 200 associated with the same account that subscribed to the ML model and tuned the ML model at 610, may generated and send inference request 652 and perform various operation(s) based on inference 654 returned to that client application.

Although FIGS. 2-6 have been described and illustrated in the context of a provider network implementing a machine learning service, the various components illustrated and described in FIGS. 2-6 may be easily applied to other machine learning systems. As such, FIGS. 2-6 are not intended to be limiting as to other embodiments.

FIG. 7 is a high-level flowchart illustrating various methods and techniques for enforcing access restrictions for fine-tuning machine learning models, according to some embodiments. As indicated at 710, a request to perform fine-tuning on a trained machine learning model using a specified tuning data set via an interface of a machine learning service may be received, in some embodiments. The request may specify a fine-tuning type, in some embodiments, that specifies access-restriction enforced fine-tuning for a model consumer and model provider. As discussed above with regard to FIG. 4, various hyperparameters or other configuration for fine-tuning may be allowed, in some embodiments. For instance, a model provider may support the selection by a consumer of different hyperparameters, which may be included in the request.

As indicated at 720, a set of weights of the trained machine learning model, the tuning data set, and tuning instructions for performing the fine-tuning on the trained machine learning model, where the trained machine learning model is obtained from a model provider with provider access restrictions on the set of weights, and the tuning data set is obtained from a model consumer with consumer access restrictions on the tuning data set, in some embodiments. For example, escrow or other access-restricted data storage locations may be accessed by the machine learning service without providing access to a consumer that submitted the request to perform fine-tuning.

As indicated at 730, the tuning instructions may be executed to generate a set of fine-tuned weights at computing resource(s) of the machine learning service provisioned to perform the fine-tuning us the tuning data set and the set of weights of the trained machine learning model, where the fine-tuned weights are used in combination with the set of weights of the trained machine learning model to perform inferences, and where the execution enforces the provider and consumer access restrictions, in some embodiments. As discussed above with regard to FIG. 5, various fine-tuning techniques that utilize both the set of weights of the trained model and new weights to be used as the fine-tuned weights may be performed (e.g., PEFT techniques such as LORA, AdaLORA, and Prefix Tuning among others). In some embodiments, fine-tuned weights may be referred to as the "delta weights".

As indicated at 740, the set of fine-tuned weights in a storage location that satisfies the consumer access restrictions may be stored, in some embodiments. For example, access to the storage location may be limited to requests verified as authorized by an account that requested fine-tuning and provided the tuning data set.

Once fine-tuned, the machine learning model can be deployed on behalf of the model consumer for various uses.

FIG. 8 is a high-level flowchart illustrating various methods and techniques for deploying a fine-tuned machine learning model and enforcing access restrictions, according to some embodiments. As indicated at 810, a request to deploy a fine-tuned machine learning model, may be received, in some embodiments. As noted above, various deployment configuration information, including host system resources or capabilities and host system location may be specified.

As indicated at 820, computing resource(s) may be provisioned to host the fine-tuned machine learning model, in some embodiments. For example, the specified deployment configuration information may be used to obtain, prepare and/or configure a host system for the fine-tuned machine learning model. Various network configuration operations may be performed to prepare network resources (e.g., firewalls, specialized network endpoints, virtual private networks, etc.) to enforce access restrictions.

As indicated at 830, a set of weights of the trained machine learning model, a tuned set of weights, and inference instructions for performing inferences on the fine-tuned machine learning model may be obtained, in some embodiments. As indicated at 840, the computing resources may be made available to perform inferences according to the inference instructions using a combination of the set of weights of the trained machine learning model and the tuned set of weights while enforcing model provider access restrictions and consumer access restrictions, in some embodiments.

The methods described herein may in various embodiments be implemented by any combination of hardware and software. For example, in one embodiment, the methods may be implemented on or across one or more computer systems (e.g., a computer system as in FIG. 9) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
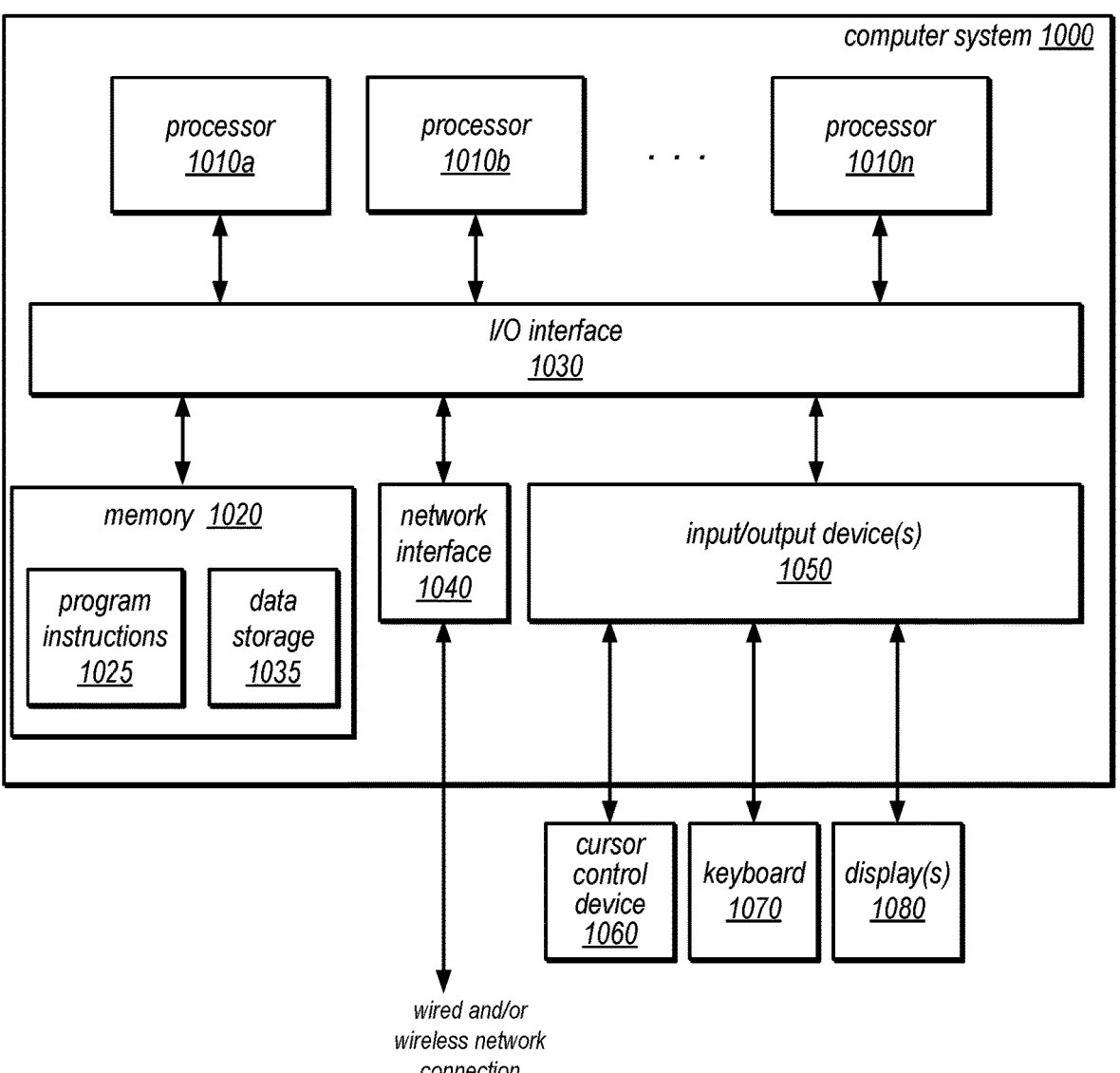
FIG. 9 illustrates an example system to implement the various methods, techniques, and systems described herein, according to some embodiments.

Embodiments of enforcing access restrictions for fine-tuning machine learning models as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above to implement explanation jobs for computer vision tasks, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL))

corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a plurality of computing devices, respectively comprising at least one processor and a memory, that implement a machine learning service of a provider network;
wherein the machine learning service, is configured to:
receiving a request to perform opaque fine-tuning on a trained machine learning model using a specified tuning data set via an interface of the machine learning service implemented as part of a provider network;
provision one or more computing resources to perform the opaque fine-tuning on the trained machine learning model;
obtain, at the one or more computing resources, a set of weights of the trained machine learning model, the tuning data set, and tuning instructions for performing the opaque fine-tuning on the trained machine learning model, wherein the trained machine learning model is obtained from a model provider with provider access restrictions on the set of weights, and wherein the tuning data set is obtained from a model consumer with consumer access restrictions on the tuning data set;
cause the tuning instructions to generate a new set of fine-tuned weights at the one or more computing resources of the machine learning service provisioned to perform the opaque fine-tuning such that the set of weights of the trained machine learning are not modified, wherein the fine-tuned weights are used in combination with the set of weights of the trained machine learning model to perform inferences, wherein the generation uses the tuning data set and the set of weights of the trained machine learning model, and wherein to cause the tuning instructions to generate the new set of fine-tuned weights, the machine learning service is configured to:
enforce, at the one or more computing resources provisioned to perform the fine-tuning, the provider access restrictions and the consumer access restrictions; and
cause the new set of fine-tuned weights to be stored in a storage location that satisfies the consumer access restrictions.

2. The system of claim 1, wherein the machine learning service is further configured to:
receive a request to deploy the opaque fine-tuned machine learning model;
provision one or more additional computing resources to host the opaque fine-tuned machine learning model;
obtain, at the one or more additional computing resources, the set of weights of the trained machine learning model, the tuned set of weights, and inference instructions; and
make the one or more additional computing resources available to perform inferences according to the inference instruction using the opaque fine-tuned machine learning model.

3. The system of claim 2, wherein the machine learning service is further configured to perform one or more inference requests at the additional one or more computing resources using the fine-tuned machine learning model to return one or more inferences responsive to the one or more inference requests.

4. The system of claim 1, wherein the trained machine learning model is one of a plurality of different machine learning models offered as part of a machine learning model catalog implemented in the provider network.

5. A method, comprising:
receiving a request to perform fine-tuning on a trained machine learning model using a specified tuning data set via an interface of a machine learning service;
obtaining, by the machine learning service, a set of weights of the trained machine learning model, the tuning data set, and tuning instructions for performing the fine-tuning on the trained machine learning model, wherein the trained machine learning model is obtained from a model provider with provider access restrictions on the set of weights, and wherein the tuning data set is obtained from a model consumer with consumer access restrictions on the tuning data set;
executing, by the machine learning service, the tuning instructions to generate a new set of fine-tuned weights at one or more computing resources of the machine learning service provisioned to perform the fine-tuning such that the set of weights of the trained machine learning are not modified, wherein the fine-tuned weights are used in combination with the set of weights of the trained machine learning model to perform inferences, wherein the executing uses the tuning data set and the set of weights of the trained machine learning model, and wherein the executing comprises:
enforcing, at the one or more computing resources provisioned to perform the fine-tuning, the provider access restrictions and the consumer access restrictions; and
storing, by the machine learning service, the new set of fine-tuned weights in a storage location that satisfies the consumer access restrictions.

6. The method of claim 5, further comprising:
receiving a request to deploy the fine-tuned machine learning model;
provisioning one or more additional computing resources to host the fine-tuned machine learning model;
obtaining, at the one or more additional computing resources, the set of weights of the trained machine learning model, the tuned set of weights, and inference instructions; and making the one or more additional computing resources available to perform inferences according to the inference instruction using the fine-tuned machine learning model.

7. The method of claim 6, wherein the request to deploy the fine-tuned machine learning model specifies a computing resource configuration, wherein the one or more additional computing resources are selected for provisioning to satisfy the computing resource configuration.

8. The method of claim 6, further comprising performing one or more inference requests at the additional one or more computing resources using the fine-tuned machine learning model to return one or more inferences responsive to the one or more inference requests.

9. The method of claim 5, wherein the request to perform fine-tuning specifies one or more hyperparameters to apply when executing the training instructions.

10. The method of claim 5, wherein enforcing the provider access restrictions and the consumer access restrictions comprises implementing a networking configuration for the one or more computing resources that prevents data exfiltration.

11. The method of claim 5, wherein the request to perform fine-tuning selects one of a plurality of different opaque fine-tuning techniques to apply when executing the training instructions.

12. The method of claim 5, further comprising creating a model package for deploying the fine-tuned machine learning model responsive to a request received via the interface of the machine learning service.

13. The method of claim 5, wherein the trained machine learning model is one of a plurality of different machine learning models offered as part of a machine learning model catalog implemented in the provider network.

14. One or more non-transitory, computer-readable storage media, storing program instructions that when executed on or across one or more computing devices cause the one or more computing devices to implement:

receiving a request to perform fine-tuning on a trained machine learning model using a specified tuning data set via an interface of a machine learning service implemented as part of a provider network;

obtaining, by the machine learning service, a set of weights of the trained machine learning model, the tuning data set, and tuning instructions for performing the fine-tuning on the trained machine learning model, wherein the trained machine learning model is obtained from a model provider with provider access restrictions on the set of weights, and wherein the tuning data set is obtained from a model consumer with consumer access restrictions on the tuning data set;

causing, by the machine learning service, the tuning instructions to generate a new set of fine-tuned weights at one or more computing resources of the machine learning service provisioned to perform the fine-tuning such that the set of weights of the trained machine learning are not modified, wherein the fine-tuned weights are used in combination with the set of weights of the trained machine learning model to perform inferences, wherein the generation uses the tuning data set and the set of weights of the trained machine learning model, and wherein in causing the tuning instructions to generate the new set of fine-tuned weights, the program instructions cause the one or more computing devices to implement:

enforcing, at the one or more computing resources provisioned to perform the fine-tuning, the provider access restrictions and the consumer access restrictions; and causing, by the machine learning service, the new set of fine-tuned weights to be stored in a storage location that satisfies the consumer access restrictions.

15. The one or more non-transitory, computer-readable storage media of claim 14, storing further program instructions that when executed on or across the one or more computing devices, cause the one or more computing devices to further implement:

receiving a request to deploy the fine-tuned machine learning model;

provisioning one or more additional computing resources to host the fine-tuned machine learning model;

obtaining, at the one or more additional computing resources, the set of weights of the trained machine learning model, the tuned set of weights, and inference instructions; and making the one or more additional computing resources available to perform inferences according to the inference instruction using the fine-tuned machine learning model.

16. The one or more non-transitory, computer-readable storage media of claim 15, wherein the request to deploy the fine-tuned machine learning model specifies a location for deployment, wherein the one or more additional computing resources are provisioned in the location.

17. The one or more non-transitory, computer-readable storage media of claim 15, storing further program instructions that when executed on or across the one or more computing devices, cause the one or more computing devices to further implement performing one or more inference requests at the additional one or more computing resources using the fine-tuned machine learning model to return one or more inferences responsive to the one or more inference requests.

18. The one or more non-transitory, computer-readable storage media of claim 14, wherein, in enforcing the provider access restrictions and the consumer access restrictions, the program instructions cause the one or more computing devices to implement a networking configuration for the one or more computing resources that prevents data exfiltration.

19. The one or more non-transitory, computer-readable storage media of claim 14, wherein the trained machine learning model is one of a plurality of different machine learning models offered as part of a machine learning model catalog implemented in the provider network.

20. The one or more non-transitory, computer-readable storage media of claim 19, wherein the trained machine learning was submitted with opaque fine-tuning enabled.

* * * * *